Aug. 16, 1927. A. VARAUD Re. 16,703

CLOCKWORK FOR MECHANICAL FUSES FOR ARTILLERY PROJECTILES

Original Filed May 1, 1925

INVENTOR
André Varaud
BY
ATTORNEYS

Reissued Aug. 16, 1927. Re. 16,703

UNITED STATES PATENT OFFICE.

ANDRÉ VARAUD, OF GENEVA, SWITZERLAND.

CLOCKWORK FOR MECHANICAL FUSES FOR ARTILLERY PROJECTILES.

Original No. 1,577,391, dated March 16, 1926, Serial No. 27,121, filed May 1, 1925. Application for reissue filed July 7, 1927. Serial No. 204,046.

The present invention relates to clockwork for mechanical fuses for artillery projectiles and more particularly to the devices comprising the regulator and escapement mechanism used for controlling the operation of the clockwork.

Heretofore in a clockwork for similar purposes it has been proposed to employ a balance regulator carried by a spring and also to use an escapement such as is commonly employed in watches, but heretofore it has been practically impossible to construct a device of this kind capable not only of resisting the effect of inertia produced at the moment of firing the projectile, but also of resisting the disturbing action of centrifugal force during the trajectory of the projectile, and which finally is capable of giving to the balance free oscillations of great amplitude in order to regulate the transmission of the motive power.

In operating the balance of all these known devices, it is practically impossible to use a spiral spring arranged in the geometrical axis of the fuse owing to the fact that on the one hand the centrifugal force, acting on the convolutions of the spiral, disturbs the device and destroys the isochronism of the oscillations of the balance, and on the other hand the deformations or jerks produced by the effects of inertia at the moment of the departure of the projectile tend to negative the function of the device altogether.

Attempts have been made to replace the springs, as they have grown classic in horology, either by a flexible blade traversing the axle of the balance and fixed at both of its ends with the required play for working under flexion, that is to say it was sought to substitute for the former spiral springs a torsion spring arranged in the axis of rotation of the projectile. It has thereby been possible for the balance spring to support the chock due to inertia and to obviate to a certain extent the inconveniences resulting from the perturbing action of the centrifugal force.

But it is evident that these springs have necessarily but little power and elasticity and it has not been possible to give to the oscillations of the balance an adequate isochronism and a sufficiently great amplitude to assure a perfect regularity of the transmission of the motive power and to use an escapement giving free oscillations to the balance. The detent escapements, the free lever escapements and the horizontal (cylinder) escapements being too delicate or impractical for use in this particular case, it has been necessary to adhere to the anchor recoil or mixed escapement that is to say to an escapement having a slight rest or locking in which the amplitude of the oscillations of the balance is limited by the base or bottom of the teeth of the escapement wheel. On the other hand the little elasticity of these springs does not permit to have them sufficiently strong to be adapted for maintaining the isochronism of the oscillations of the balance in spite of the irregularities which may occur in the action of the centrifugal force, when, for example, the projectile does not turn exactly round its geometrical axis, a phenomenon known as nutation.

Heretofore it has been proposed to employ a cylindrical escapement with pins and in which the axes of the balance and that of the escapement wheel are parallel whereby the balance is given free oscillations of relatively large amplitude, but it has been found that the pins as hertofore employed were too delicate to answer the required purposes, the rests or stops of the escapement wheel, being determined by the tangential contact of a pin with the periphery of a relatively large cylinder also, created frictional forces too great to permit the balance to describe under normal conditions its supplementary arcs. Now, in a clockwork for mechanical fuses, more than in any other, owing to the variations in motive power caused by the more or less great intensity of the centrifugal force, it is necessary to be able to give to the balance oscillations of great amplitude if one wishes to obtain strict isochronism of these oscillations which is, indispensable for the exact rate of the clockwork.

The clockwork which is the object of this invention measures up to all these requirements and differs from the clockwork devices for mechanical fuses by the fact that it comprises a cylindrical balance spiral couched transversely in the fuse and preferably perpendicular to the axis of rotation of the projectile, a supporting member upon which this spiral rests momentarily at the time of the departure of the projectile upon being fired, and a dead-beat escapement which makes it possible to give the balance oscillations of relatively large amplitude.

The annexed design represents by way of example a constructional form of the device being the object of the invention.

Figure 1:
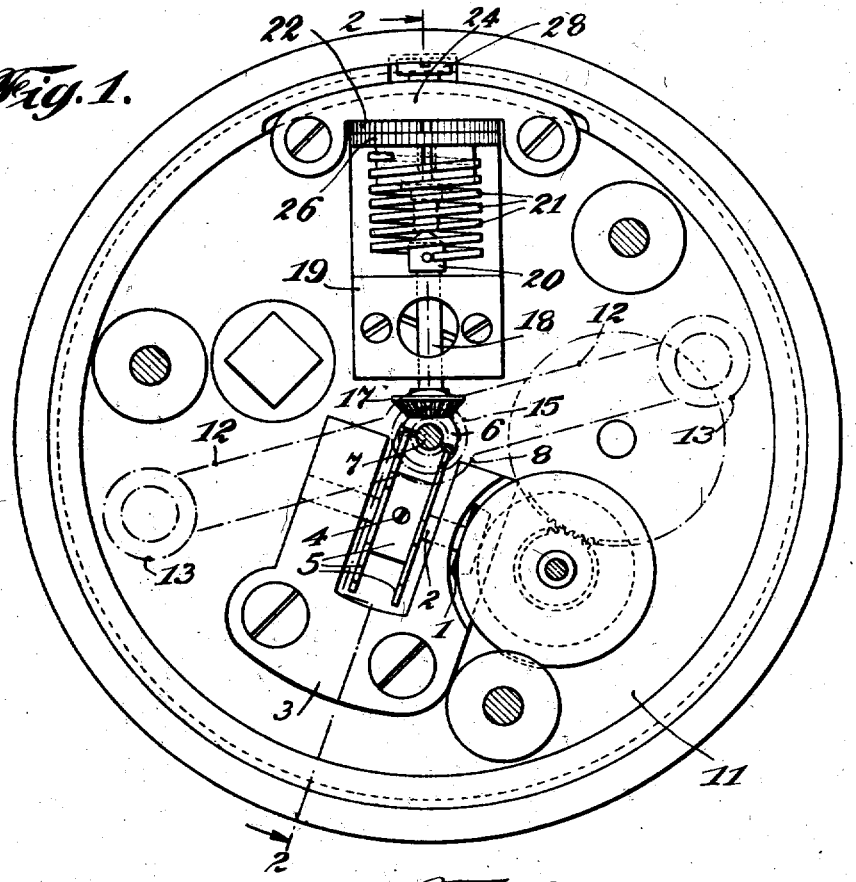
Fig. 1 is a partial section made along the line 1—1 of Fig. 2 of this form, indicating in dotted lines a part of the train of the movement and of the balance.
Figure 2:
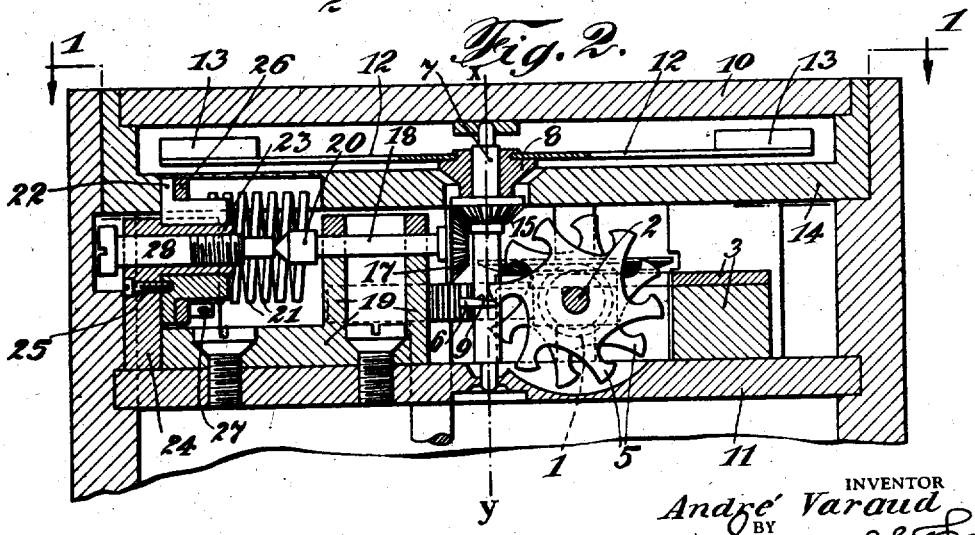
Fig. 2 is a transversal section drawn along the angle line 2—2 of Fig. 1.

According to the drawing the last wheel of the clockwork gear train of the fuse (of which only the part where the regulator and the escapement are placed is represented) is a bevelled pinion 1 fixed upon one of the ends of a small spindle 2 revolving in a U shaped bearing 3. In the middle of this spindle is fastened by means of a radial screw 4 a double escapement wheel 5 of the alternate tooth type well known in itself, but which has heretofore been used only for clocks and called after its inventor the "Garnier escapement wheel." This wheel cooperates with a collet in the form of a sector 6 fixed upon the spindle or rod 7 of the balance 8. The angle of this sector is between 160° and 200°. By the pressure of the inclined parts of the teeth of the double wheel upon the section of the sector impulses are alternately transmitted first in one direction and then in the other on either side of the spindle 7 while the locking takes place when the point of one of the teeth of the wheel 5 rests upon the face of the sector 6. In order to facilitate the disengagement this face is slightly inclined at 9 towards the end face of the sector.

The spindle 7 revolves in a manner already known in the axis $x$—$y$ of the fuse between two plates 10 and 11 of said fuse and carries upon its upper part the balance 8 which consists two blades 12 in alignment with one another. Each of these blades is a thin and flexible strip of metal which carries on its free end a small weight 13. An intermediate plate 14 limits the bending of these blades 12 which is produced by inertia at the time of firing of the projectile to which the fuse is fixed.

The spindle 7 carries likewise a bevelled pinion 15 which engages with a second bevelled gear 17, attached to one end of a small radial spindle 18 rotating in a bearing 19. At its other end, this radial spindle 18 carries a stud 20 for fixing one of the ends of the cylindrical or helical spring 21 of the balance, which spring is radially couched across the fuse and whose axis is consequently perpendicular to the axis $x$—$y$ of the latter. The other end of this balance spring 21 is attached to a split ring 22 which is adjustable in angular position on a cylindrical bearing 23 of a stud 24 screwed upon the plate 11.

A small set screw 25, revolving in the stud 24 permits the ring 22 to be secured in its set position. This ring 22 has a cylindrical projection, upon which a split ring 26 is frictionally mounted which acts as a racket in the following manner. This split ring 26 carries on its inner face a small stud 27 through which the outmost coil or convolution of the balance spring 21 passes freely, so that by an angular displacement by hand of the split ring 26 with regard to the ring 22, the useful length of said spring will be regulated. The ring 22 as well as the split ring 26 are milled at their periphery to facilitate being gripped by hand. A regulating screw 28 is adjustable in the stud 24 and makes it possible to regulate the axial position of the spindle 18 with regard to the bearing 19 so as to assure the correct meshing of the bevelled pinions 15 and 17 regardless of the action of the centrifugal force developed by the rotation of the projectile to which the fuse has been fitted.

A part of the bearing 19 extends beneath the balance spring 21 so as to act as a supporting member at the moment of the departure of the projectile.

The working of this form of embodiment of the invention is as follows:

The fuse is mounted in the pointed part of the projectile so that its axis $x$—$y$ coincides with the axis of the latter and the balance 8 12 is locked by any appropriate means (not illustrated) in its arrested position until the firing moment. Said locking means are at the moment of the departure of the projectile by the inertia or by centrifugal force automatically withdrawn.

The relative position of the balance and of the escapement wheel is regulated in the course of the manufacture of the clockwork by means of the split ring 22 so that one of the cogs of the escapement wheel is normally ready in position to give a first impulse to the balance, while the spring 21 is afterwards regulated by means of the split ring or racket 26. As soon as the liberation of the balance takes place, the escapement wheel thus gives an impulse to the balance and thereupon remains at rest during the whole duration of the oscillation of the said balance. At the end of this oscillation the cog, which determined the locking, gives in its turn an impulse to the balance in the opposite direction and the following cog comes into the position of rest and so forth.

It would be possible to apply two cylindrical springs for the balance and the latter might have more than two blades or might comprise a full flywheel.

One could reverse the arrangement of the balance and that of the escapement wheel; this latter being then placed parallel to the axis of the fuse while the spindle 7 and the spindle 18 of the spring 21 become one and the same. In this case the bevelled gears 15, 17 would of course be eliminated. It will also be understood that the construction of the dead-beat escapement mechanism may be varied within the scope of the claims without departing from the invention.

I claim as my invention:

1. In a clockwork for mechanical fuses for artillery projectiles, a balance, a cylindrical spiral so placed that the axis thereof is transverse of the fuse and perpendicular to the axis of rotation of the projectile, a supporting member upon which said spiral momentarily rests at the time of the departure of the projectile upon being fired, and a dead-beat escapement whereby oscillations of relatively large amplitude are given to the balance.

2. In a regulator for clock-work operated fuses for artillery projectiles, a balance, an arbor for the same, an escapement wheel, an arbor for the same, the arbors for the said balance and escapement wheel being perpendicular to each other, and a spiral spring for regulating the action of the said balance and escapement wheel, the axis of the spiral spring being transversely of the fuse and perpendicular to the axis of the projectile to which the fuse is attached.

3. In a regulator for clock-work operated fuses for artillery projectiles, a balance, an arbor for the same, a sector-like shoulder on the arbor of the balance, an escapement wheel adapted to engage the said sector-like shoulder, and a spiral spring for regulating the action of the balance and escapement wheel, the axis of the spiral spring being transversely of the fuse and perpendicular to the axis of the projectile to which the fuse is attached.

4. In a clock-work for mechanical fuses for artillery projectiles, a balance, an arbor for the same, an escapement wheel for actuating the balance, a spiral spring, an arbor for the same, and meshing bevel gears on the said arbors, the axis of the said spiral spring and the arbor therefor being transversely of the fuse and perpendicular to the axis of the projectile to which the fuse is attached.

5. In a clock-work for mechanical fuses for artillery projectiles, a balance, an arbor therefor, an escapement wheel, a shoulder on the arbor of the balance adapted to be engaged by the escapement wheel for actuating the balance, a spiral spring, an arbor for the same, meshing bevel gears on the said arbors, and means for adjusting the tension of the said spiral spring, the axis of the said spiral spring and its arbor being transversely of the fuse and perpendicular to the axis of the projectile to which the fuse is attached.

6. In a clock-work for mechanical fuses for artillery projectiles, a balance, an arbor therefor, an escapement wheel, a shoulder on the arbor of the balance adapted to be engaged by the escapement wheel for actuating the balance, a spiral spring, an arbor for the same, meshing bevel gears on the said arbors, a stud at one end of the arbor of the spiral spring, a split ring to which the opposite end of the spiral spring is connected, and means for revolubly adjusting and securing the split ring in position to determine the tension of the spiral spring, the axis of the said spiral spring and its arbor being transversely of the fuse and perpendicular to the axis of the projectile to which the fuse is attached.

7. In a clock-work for mechanical fuses for artillery projectiles, a balance, an arbor therefor, a double escapement wheel, a shoulder on the arbor of the balance, the said shoulder having an inclined edge to facilitate its disengagement with the said double escapement wheel, a spiral spring, an arbor for the same, meshing bevel gears on the said arbors, a stud at one end of the arbor of the spiral spring, a split ring to which the opposite end of the spiral spring is connected, and means for revolubly adjusting and securing the split ring in position to determine the tension of the spiral spring, the axis of the said spiral spring and its arbor being transversely of the fuse and perpendicular to the axis of the projectile to which the fuse is attached.

8. In a clockwork operated mechanical fuse for artillery projectiles and in the balance regulator for the clockwork thereof, a spiral spring so placed that the axis thereof extends at an appreciable angle to the axis of rotation of the fuse whereby centrifugal force due to the rotation of the fuse on its own axis acts on the convolutions of the spring in a path substantially parallel to the axis of the spring thereby minimizing the effect of centrifugal force on the oscillations of the spring.

9. In a clockwork operated mechanical fuse for artillery projectiles and in the balance regulator for the clockwork thereof, a spiral spring with the axis thereof so placed as to lie at right angles to the axis of rotation of the fuse whereby centrifugal force due to the rotation of the fuse on its own axis acts on the convolutions of the spring in a path effectively parallel to the axis of the spring thereby minimizing the influence of the centrifugal force on the oscillations of the said spring.

10. In a mechanical clockwork operated fuse for artillery projectiles, a clockwork including a dead-beat escapement comprising a balance, a spindle for said balance disposed in the axis of the fuse, an escapement wheel, a spindle for the same at right angles to the balance spindle, and a shoulder on the balance spindle against which the teeth of the escapement wheel successively contact to determine periods of rest of the escapement wheel that correspond to balance oscillations which are of large amplitude.

Signed by me this 8th day of June, 1927.

ANDRÉ VARAUD.